H. M. OLMSTED.
Drill-Chucks.

No. 146,143.  Patented Jan. 6, 1874.

Witnesses
John Pollitt
Henry Small

Inventor
Henry Olmsted
By Wm E Simmds
Atty

UNITED STATES PATENT OFFICE.

HENRY M. OLMSTED, OF NEW BEDFORD, MASSACHUSETTS, ASSIGNOR TO CHANDLER JOHNSON, OF HARTFORD, CONNECTICUT.

IMPROVEMENT IN DRILL-CHUCKS.

Specification forming part of Letters Patent No. 146,143, dated January 6, 1874; application filed November 12, 1873.

*To all whom it may concern:*

Be it known that I, HENRY M. OLMSTED, of New Bedford, in the county of Bristol and State of Massachusetts, have invented certain new and useful Improvements in Drill-Chucks, of which the following is a specification, reference being had to the accompanying drawings, where—

Figure 2:
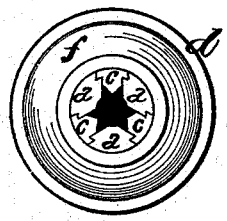
Figure 1:
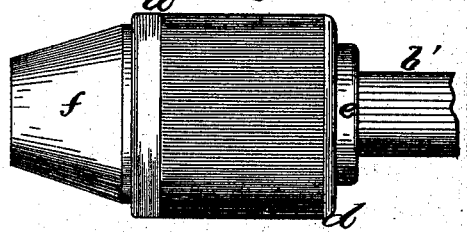
Figure 3:
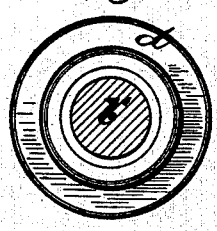
Figure 4:
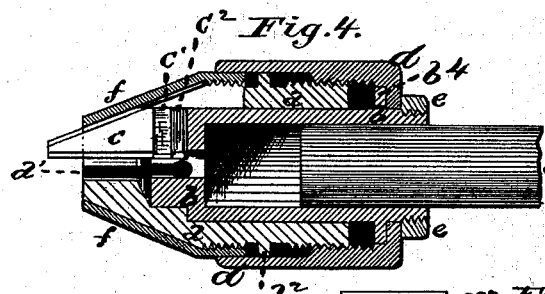
Figure 5:
Figure 6:
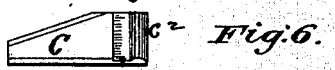
Figures 7, 8:
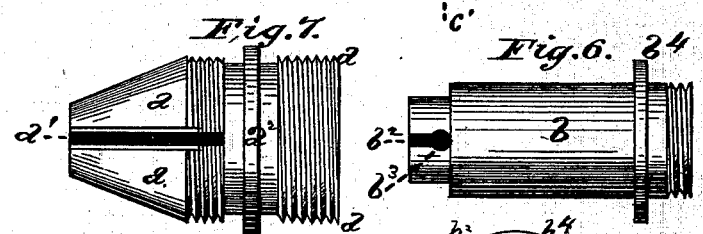
Figure 9:
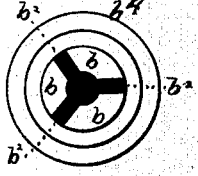

Figure 1 is a side view of the complete chuck. Fig. 2 is a front-end view of the same. Fig. 3 is a rear-end view of the same. Fig. 4 is a view of the chuck in central longitudinal section, showing but one of the jaws in its place. Fig. 5 is a detached top view of one of the jaws. Fig. 6 is a detached side view of one of the jaws. Fig. 7 is a detached side view of the main stock or body of the chuck. Fig. 8 is a detached side view of the inner central sleeve of the chuck. Fig. 9 is a view of the front end of the inner central sleeve.

The letter $a$ denotes the main stock or body of the chuck, with an inner central sleeve, $b$, inside it, into which fits the lathe-spindle $b^1$. In the front end of the sleeve $b$ are three radial mortises or slots, $b^2$, each having an enlargement, $b^3$, at the rear, preferably circular in shape. The jaws $c$ are attached to the sleeve $b$ by means of these peculiar mortises or slots. These jaws are shown in Figs. 5 and 6, their top or outer edges converging toward a point at the front, with a neck, $c^1$, just fitting into a slot, $b^2$, and with an enlargement, $c^2$, back of the neck, just fitting into the enlarged hole $b^3$, so that these jaws must move longitudinally with the sleeve $b$, while they are free to move radially independent of the sleeve. As a matter of fact, the sleeve $b$ and the jaws $c$ do not move longitudinally, but remain stationary while the other parts move. The front end of the stock $a$ is conical, and converges toward a point. It has equidistant radial slots $a^1$, in which lie the jaws $c$. An outer sleeve, $d$, screws upon the stock $a$, resting, at the rear, upon and against the collar $b^4$, and toward the front upon the collar $a^2$. A ring or detachable collar, $e$, screwing on the rear end of the sleeve $b$, so secures the sleeve $d$ to the sleeve $b$, that the two must move longitudinally together, while they can rotate independently of each other. It is obvious that the rotation of the sleeve $d$ upon the sleeve $b$ will cause the longitudinal movement of the stock $a$, while the sleeve $b$ and jaws $c$ remain stationary, both longitudinally and rotarily. On the front end of the stock $a$ screws the conical shell $f$, its rear end running under the front end of the sleeve $d$. This conical shell moves longitudinally with the stock $a$, and it is obvious that causing the stock $a$ and this conical shell to retreat, while the jaws $c$ remain stationary, will cause the jaws to close together with equal radial motion, and that a reverse motion will open the jaws equally—that is, the rotation of the sleeve $d$ causes the opening and closing of the jaws.

I claim as my invention—

1. In a chuck, the combination of the part $b$, having the peculiar mortises or slots $b^2$ $b^3$, with the jaws $c$, having the neck $c^1$ and enlargements $c^2$, the whole constructed, arranged, and designed for operation and use, substantially as set forth.

2. The combination of the stock $a$, central part $b$, jaws $c$, sleeve $d$, collar $e$, and shell $f$, all constructed, arranged, and designed for operation and use, substantially as set forth.

HENRY M. OLMSTED.

Witnesses:
E. I. BARNEY,
H. M. KNOWLTON.